United States Patent [19]

Lindell

[11] Patent Number: 4,575,303

[45] Date of Patent: Mar. 11, 1986

[54] DEVICE FOR HANDLING AND MOVING CYLINDRICAL UNITS

[76] Inventor: Bengt Lindell, S-563 00 Gränna, Sweden

[21] Appl. No.: 614,643

[22] Filed: May 29, 1984

[51] Int. Cl.$^4$ ............................ B60P 1/50; B60P 3/00
[52] U.S. Cl. ................... 414/430; 414/492; 414/911
[58] Field of Search .............. 414/429, 430, 491–494, 414/745, 910, 911, 24.5, 525 R, 546, 547, 549, 555, 684, 729, 739, 458, 537, 538, 539

[56] References Cited

U.S. PATENT DOCUMENTS

| 1,819,625 | 8/1931 | Schroeder ........................ 414/494 |
| 3,037,651 | 6/1962 | Smith et al. . |
| 3,184,088 | 5/1965 | Berge . |
| 3,224,611 | 12/1965 | Smuck . |
| 3,373,886 | 3/1968 | Ulinski . |
| 4,057,158 | 11/1977 | Lissy . |

FOREIGN PATENT DOCUMENTS 521178 9/1976 U.S.S.R. ............................ 414/911

Primary Examiner—Robert G. Sheridan
Attorney, Agent, or Firm—Sheridan Neimark; A. Fred Starobin; Karl W. Flocks

[57] ABSTRACT

A device for handling and moving generally cylindrical loads, such as cable reels, rolls of paper, sheet metal, and the like, comprising a frame supported by wheels or the like and provided with vertically pivotable, laterally movable telescoping arms for retentive engagement with the load to move said load toward and away from a load-supporting surface of said frame. The device is characterized in that said load-supporting surface is a part of a cradle having a wedge-shaped roll-on/roll-off portion at its free edge and a downwardly curved surface portion forming the actual load-supporting surface; that said cradle is tiltable about a shaft, mounted beneath the downwardly curved portion between a position in which its wedge-shaped portion connects to the floor, and a transport position in which it is spaced from said floor; and that said arms are individually or jointly telescopically movable past and beyond said cradle and are provided with engagement means adapted to engage with the load, the cable reel or the like during loading and unloading thereof.

9 Claims, 3 Drawing Figures

DEVICE FOR HANDLING AND MOVING CYLINDRICAL UNITS

The present invention relates to a device for handling and moving generally cylindrical loads, such as cable reels, rolls of paper, sheet metal, and the like, comprising a frame supported by wheels or the like and provided with vertically pivotable, laterally movable telescoping arms for retentive engagement with the load to move said load toward and away from a load-supporting surface of said frame.

Moving large cable reels, rolls of paper, sheet metal and the like causes much difficulty in narrow spaces or other premises where conventional materials handling devices cannot be used. The object of the present invention is to provide an apparatus for simply and conveniently moving cable reels or the like also in passages insignificantly larger than the reel itself.

To achieve this object, the device according to the invention is essentially characterised in that said load-supporting surface is a part of a cradle having a wedge-shaped roll-on/roll-off portion at its free edge and a downwardly curved surface portion forming the actual load-supporting surface; that said cradle is tiltable about a shaft, mounted beneath the downwardly curved portion, between a position in which its wedge-shaped portion connects to the floor, and a transport position in which it is spaced from said floor; and that said arms are individually or jointly telecopically movable past and beyond said cradle and are provided with engagement means adapted to engage with the load, the cable reel or the like during loading and unloading thereof.

An embodiment of the invention will be described in more detail below, reference being had to the accompanying drawings in which.

Figure 1:
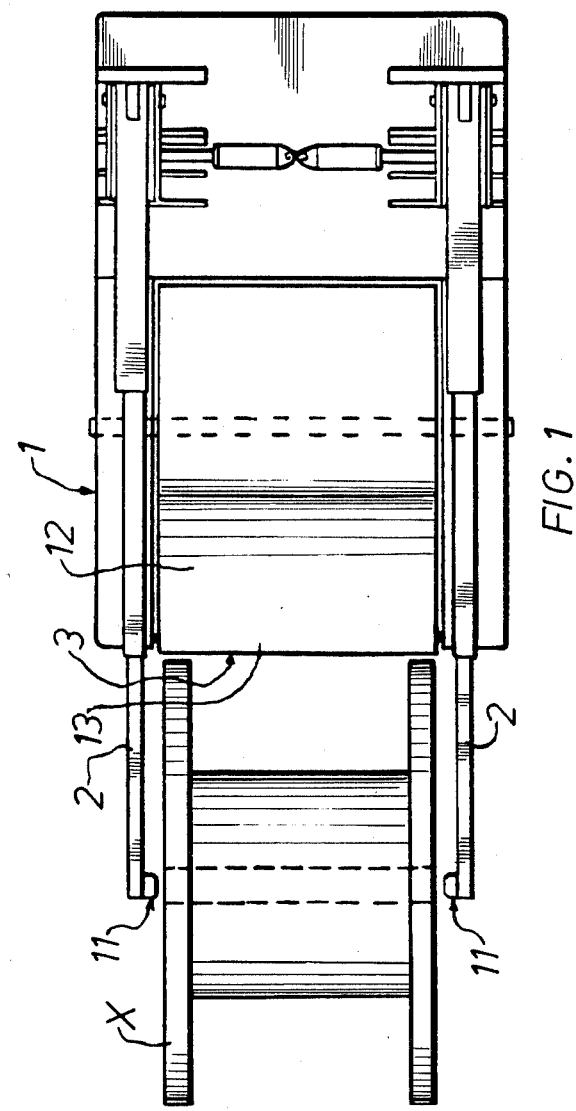
FIG. 1 is a top plan view of the device according to the invention.

Mounted on a frame 1 are arms 2 and and a cradle 3. The frame is supported by a number of wheels 4 or the like which may be of the castor type or may otherwise permit steering of the device in any desired direction.

One end portion 5 of the frame is provided with guides 5 for brackets 7 in which the arms 2 are pivotably mounted, and with corresponding guides for hydraulic piston and cylinder assemblies 8 (FIG. 2) controlling the pivotal movement of said arms.

Extending from said end portion 5 are a pair of frame beams 9 with bearings for a shaft 10 about which the cradle 3 is tiltable.

The arms 2 are telescopically mounted and can be extended and retracted by means of piston and cylinder assemblies not shown. Fixed or axially displaceable pins 11 or the like are provided at the outer ends of said arms for engaging with, for example, the center hole of a cable reel X. Instead of a pin, there may be provided at each arm end transverse rollers or the like for engaging with the periphery of a sheet metal roll or the like having no pronounced center hole suitable for the pin.

The telescopic arm movement may be synchronised such that the free ends of said arms move in unison with the same speed. Separate actuation of each piston and cylinder assembly is also possible so that the arm ends will be displaced relative to one another, thereby to facilitate gripping of cable reels standing at an angle to the handling device so that they can be turned right prior to loading.

The cradle 3 has a planar portion 12, the free edge 13 of which tapers in the form of a wedge so that it can hug the base on which the device is standing, and an arcuately curved portion 14 forming the supporting surface and having a radius of curvature which is at least equal to the radius of the largest unit to be moved.

The shaft 10 of the cradle 3 is mounted near the deepest part of the curved portion 14 so that but a slight force is required to tilt the cradle when a cable reel or the like has been pulled up to the curved portion 14 by means of the arms 2. To tilt the cradle, piston and cylinder assemblies 15 are used.

The requisite propulsion motors, hydraulic pumps etc. are accommodated by the frame portion 5 which may also house the controls.

In its preferred embodiment, the device according to the invention is self-propelled, although it may, of course, also be towed by another vehicle.

Figure 2:
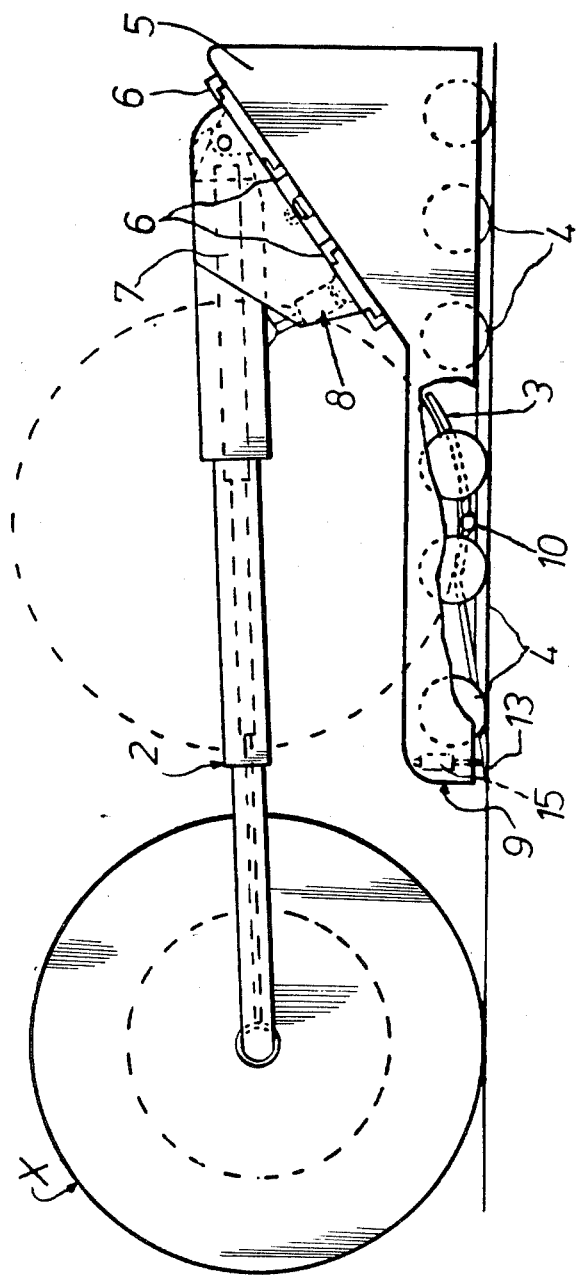
FIG. 2 is a lateral view of the device.

When a unit, such as a cable reel, is to be loaded for transport, the device is driven up to the reel, as shown in FIGS. 1 and 2.

Figure 3:
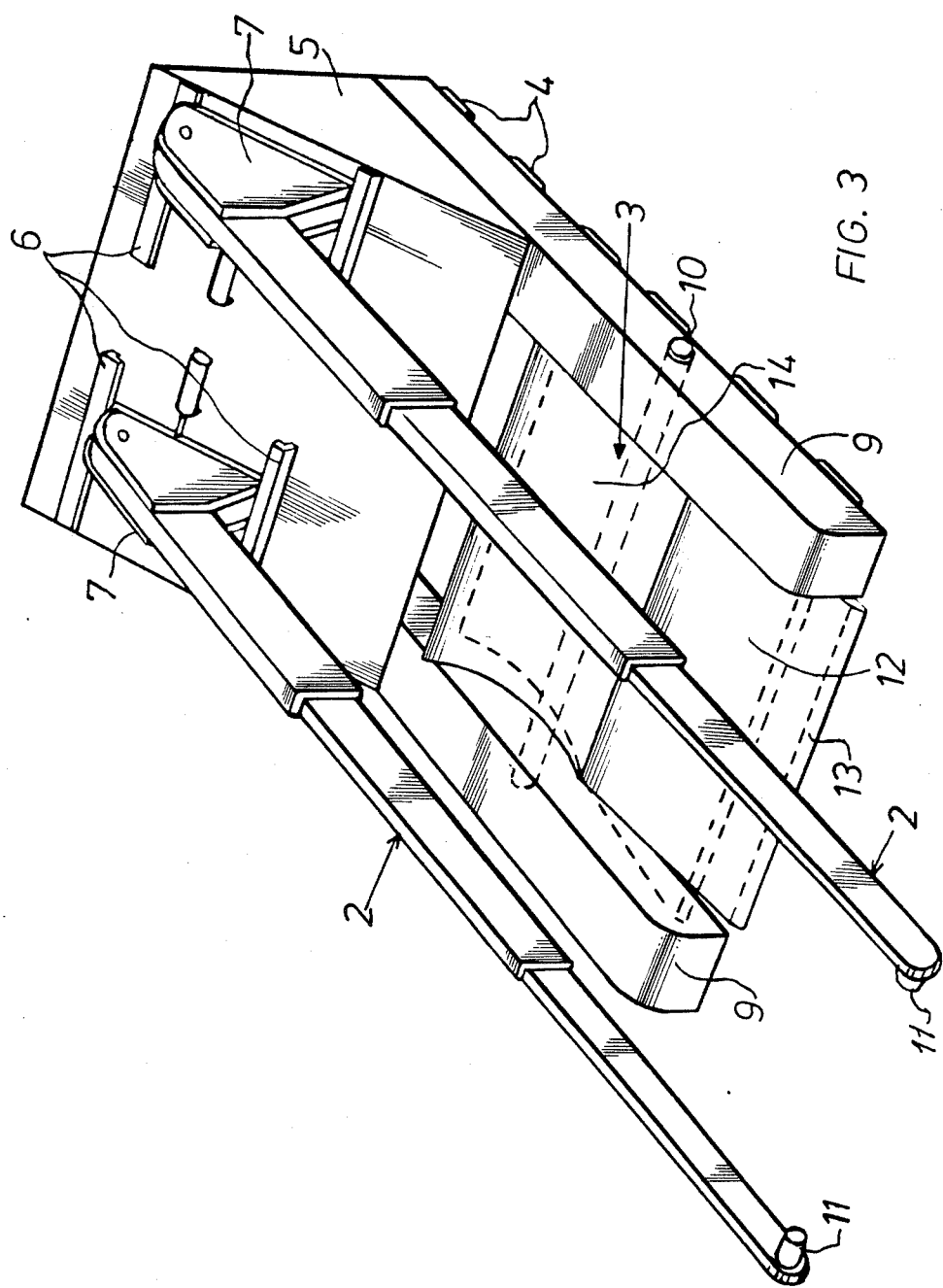
FIG. 3 is a perspective view of the said device.

Depending upon the position of the reel relative to the cradle 3, the arms 2 are displaced in one or the other direction so that they can be extended on either side of the reel, whereupon they are moved together such that the pins 11 extend into the center hole of the reel. The arms 2 are then retracted by means of the synchronised piston and cylinder assemblies, and the reel X which, if necessary, has first been correctly aligned, is rolled up on the cradle 3 which has already been tilted into the position shown in FIG. 2 in which the edge 13 engages the floor. When the reel reaches the downwardly curved portion 14, the arms are relieved because the reel will then remain in position without assistance. The cradle is now tilted into the broken-line position illustrated in FIG. 3 by means of the piston and cylinder assemblies 15, and the device is now freely movable.

Unloading is carried out in the reverse order. First the cradle is tilted so that its edge 13 engages the floor, whereupon the reel is pushed away from the cradle by means of the arms 2.

The piston and cylinder assemblies 8 serve to set the arms 2 in correct vertical position for fitting the pins 11 into the center holes. When this is done, the piston and cylinder assemblies 8 may be deactivated because the arms will then be controlled by the engagement of the pins 11 with the center hole. However, for handling units without center holes, vertical control of the arms is required.

By suitable dimensioning of the piston and cylinder assemblies 8, the arms 2 and the pins 11, the device according to the invention may be utilised also for lifting rolls of paper and the like.

What I claim and desire to secure by Letters Patent is:

1. A device for handling and moving generally cylindrical loads, such as cable reels, rolls of paper, sheet metal, and the like, comprising a frame supported by wheels;

a load-supporting surface supported on said frame;

vertically pivotable, laterally movable telescoping arms for retentive engagement with the load to move the load toward and away from said load-supporting surface;

said load-supporting surface including a cradle having a downwardly curved concave seat portion, and a downwardly sloping substantially planar wedge shaped ramp extending from said seat portion in the direction of the ends of said telescoping arms which are for engaging the load; and a transverse shaft supported by said frame, spaced from the ground surface supporting said wheels, and mounted beneath said downwardly curved seat portion;

said cradle being tiltable about said shaft;

said telescoping arms being movable past and beyond said cradle and having engagement means on their free ends adapted to engage with said cylindrical load during loading and unloading thereof.

2. The device of claim 1 further characterized by said arms being individually telescopically movable.

3. The device of claim 1 further characterized by said arms being jointly telescopically movable.

4. The device of claim 1 further characterized by said frame having two freely entending beams between which said cradle is mounted; and control means mounted between said cradle and said frame to tilt said cradle about said transverse shaft.

5. The device of claim 4 further characterized by said control means including hydraulic piston and cylinder assemblies connected between said cradle and said frame.

6. The device of claim 1 further characterized by said shaft about which said cradle is tiltable being located adjacent to a vertical plane extending through the center of a cylindrical load resting on said downwardly curved seat portion.

7. The device of claim 1 further characterized by piston and cylinder assemblies connected to said arms to accomplish the telescoping movement of said arms.

8. The device of claim 7 further characterized by said piston and cylinder assemblies connected to said arms operatable individually.

9. The device of claim 7 further characterized by said piston and cylinder assemblies connected to said arms operatable jointly.

* * * * *